US009832096B2

(12) United States Patent
Verma

(10) Patent No.: US 9,832,096 B2
(45) Date of Patent: Nov. 28, 2017

(54) MONITORING OF COMPUTER NETWORK PERFORMANCE

(71) Applicant: International Business Machines Corporation, Armonk, NY (US)

(72) Inventor: Dinesh C. Verma, New Castle, NY (US)

(73) Assignee: International Business Machines Corporation, Armonk, NY (US)

( * ) Notice: Subject to any disclaimer, the term of this patent is extended or adjusted under 35 U.S.C. 154(b) by 174 days.

(21) Appl. No.: 14/793,020

(22) Filed: Jul. 7, 2015

(65) Prior Publication Data

US 2017/0012849 A1    Jan. 12, 2017

(51) Int. Cl.
| H04L 12/50 | (2006.01) |
| H04L 12/26 | (2006.01) |
| H04L 12/801 | (2013.01) |
| H04L 12/46 | (2006.01) |
| H04L 12/721 | (2013.01) |
| H04L 12/715 | (2013.01) |
| H04L 12/841 | (2013.01) |

(52) U.S. Cl.
CPC .......... *H04L 43/10* (2013.01); *H04L 12/4633* (2013.01); *H04L 45/38* (2013.01); *H04L 45/64* (2013.01); *H04L 47/283* (2013.01); *H04L 47/34* (2013.01)

(58) Field of Classification Search
CPC ....................................................... H04L 43/10
USPC ........................................................ 370/250
See application file for complete search history.

(56) References Cited

U.S. PATENT DOCUMENTS

| 6,882,654 | B1 | 4/2005 | Nelson .......................... 370/401 |
| 7,570,589 | B1 | 8/2009 | Apostolopoulos et al. .. 370/235 |
| 8,213,325 | B2 | 7/2012 | Nomura et al. .............. 370/252 |
| 8,228,917 | B2 | 7/2012 | Vayanos et al. .............. 370/394 |
| 8,549,135 | B1* | 10/2013 | Yazdani .................. H04L 47/35 709/224 |
| 2009/0003225 | A1 | 1/2009 | Klassen et al. ............... 370/250 |
| 2009/0310491 | A1* | 12/2009 | Ginsberg ............ H04L 12/2697 370/241 |
| 2012/0163209 | A1 | 6/2012 | Kim ............................. 370/252 |

OTHER PUBLICATIONS

Prateek, A., Kumar, E. M. & Vuda, K. S., Method and System for Checking Network Stability by Identifying Packet Loss in the Network, ip.com, IPCOM000222571D, pp. 1-2 (Oct. 2012).

(Continued)

*Primary Examiner* — Dang Ton
(74) *Attorney, Agent, or Firm* — Ido Tuchman; Jennifer R. Davis

(57) ABSTRACT

A system for monitoring traffic characteristics between gateways in a computer network. The system includes a processor to construct a packet frame consisting of a sequence of network packets for transmission by a transmit gateway to receive gateways. The processor reorders network packets in the packet frame such that reordered network packets in the packet frame addressed to the same receive gateway of the plurality of receive gateways are send in uninterrupted succession. The processor then transmits the reordered network packets in the packet frame from the transmit gateway to the plurality of receive gateways.

20 Claims, 4 Drawing Sheets

(56) References Cited

OTHER PUBLICATIONS

Jayasumana, A., Piratla, N., Banka, T., et al., Improved Packet Reordering Metrics (RFC5236), ip.com, IPCOM000171306D, pp. 1-26 (Jun. 2008).
Srinivasan Keshav, Packet-Pair Flow Control, AT&T Bell Laboratories, pp. 1-45 (no publication date indicated).

* cited by examiner

MONITORING OF COMPUTER NETWORK PERFORMANCE

BACKGROUND

The present invention relates generally to computer networks, and more particularly to monitoring traffic characteristics between gateways in a computer network.

An overlay network is a computer network built on the top of another network. Nodes in the overlay can be thought of as being connected by virtual or logical links, each of which corresponds to a path, perhaps through many physical links, in the underlying network.

An overlay network is a computer network which consists of several edge routers that are put up over an underlying physical computer network. Within an overlay network, each gateway needs to monitor the performance of the connectivity it has to the other networks. In general, it requires understanding the throughput and loss rate between a given pair of gateways.

In current state of the art, there are several approaches available for monitoring network performance. However, the known monitoring approaches typically generate additional traffic workload in the network or suffer from inaccurate network performance measurements.

BRIEF SUMMARY

Accordingly, aspects of the present invention can determine network characteristics without introducing traffic overhead within the network.

One example aspect of the present invention is a method for monitoring traffic characteristics between gateways in a computer network. The method includes constructing a first packet frame consisting of a sequence of network packets for transmission by a transmit gateway to receive gateways. A reordering operation reorders network packets in the first packet frame by a computer processor such that reordered network packets in the first packet frame addressed to the same receive gateway of the receive gateways are send in uninterrupted succession. A transmitting operation transmits the reordered network packets in the first packet frame from the transmit gateway to the receive gateways.

Another example aspect of the present invention is a system for monitoring traffic characteristics between gateways in a computer network. The system includes a transmit gateway, a plurality of receive gateways, and a computer processor. The computer processor is configured to construct a first packet frame consisting of a sequence of network packets for transmission by the transmit gateway to the receive gateways. The computer processor is further configured to reorder network packets in the first packet frame such that reordered network packets in the first packet frame addressed to the same receive gateway of the receive gateways are send in uninterrupted succession. The computer processor is further configured to transmit the reordered network packets in the first packet frame from the transmit gateway to the receive gateways.

A further example aspect of the present invention is a computer program product for monitoring traffic characteristics between gateways in a computer network. The computer program product includes computer readable program code configured to construct a first packet frame consisting of a sequence of network packets for transmission by a transmit gateway to a plurality of receive gateways, reorder network packets in the first packet frame such that reordered network packets in the first packet frame addressed to the same receive gateway of the receive gateways are send in uninterrupted succession, and transmit the reordered network packets in the first packet frame from the transmit gateway to the receive gateways.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION

Figure 1:
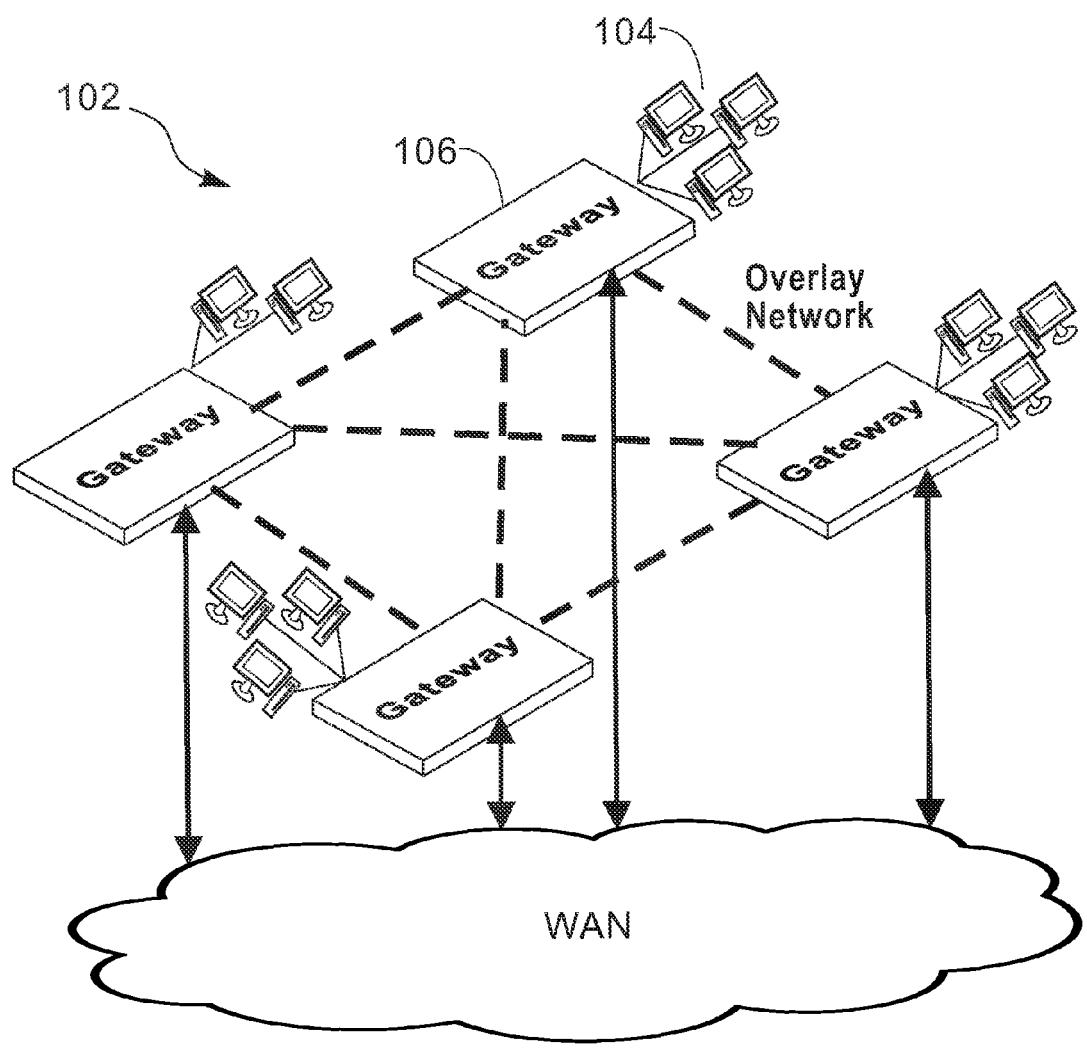
FIG. 1 shows an example network within which a system contemplated by the present invention functions.

The present invention is described with reference to embodiments of the invention. Throughout the description of the invention reference is made to FIGS. 1-4. When referring to the figures, like structures and elements shown throughout are indicated with like reference numerals.

Embodiments of the present invention reuse the existing stream of packets flowing between gateways to conduct network performance measurements. As the packets are flowing through the gateways, packet flow is rearranged so that flows going to specific gateways are bunched together. This is achieved by defining a virtual frame. A virtual frame is defined by packets that arrive within a fixed period of time. The packets are then rearranged to create a series of packet trains that can be used for monitoring.

There are a variety of approaches for monitoring network performance. These include:

(1) Active Probing: sending packets with specific format to measure delays. Techniques include pings and traceroute (two established tools), as well as existing techniques like packet pair and packet trains, when back to back packets are sent out and their separation measured. Active probes give good accurate results, but generate overhead on the network.

(2) Passive Observation: using shallow packet inspection or deep packet inspection, properties of network delays are predicted. The challenge is in getting good accuracy from these measurements. The round trip path can be estimated. However, the forward path and reverse paths may be different in networks, and in overlay networks, there are segments in round trip that do not lie between the overlay, so observed problems could be caused from parts of network beyond the region between overlay gateways. Packet inspection on one way path requires understanding characteristics of network at sending overlay gateway and receiving overlay gateway, which is very difficult to coordinate.

Unlike existing packet trains, the present approach results in no active probing of the network. For large overlays, this produces very little overhead on the network operations. It also provides monitoring of real network environment on a one-way path, unlike passive observations which try to observe characteristics on round trip paths, and have to make various modeling assumptions.

Aspects of the present invention trade off a small amount of delay in the network (one virtual frame interval) to save bandwidth on the network. In networks that have limited capacity (e.g., Internet of things (IoT) or sensor networks, wireless networks, satellite networks, large number of sites present), the present approach is superior to alternative means for observing network characteristics.

FIG. 1 shows an example network 102 within which a system contemplated by the present invention functions. The network 102 consists of multiple enclaves 104 or local area networks (LANs) connected to a wide area network (WAN). Each enclave includes one or more gateways 106 at its interface to the wide area network. The gateway 106 manages the packets flowing in or out of the enclave 104 to/from the other enclaves 104. The path between two gateways 106 need not be symmetric. That is, packets from enclave A to enclave B may flow on a different path than packets that flow from enclave B to A. The packets are send between end machines in the enclaves 104, and the gateways 106 are intermediaries that are not directly identified in the packet headers.

The virtual packet train is a new mechanism proposed herein for monitoring the characteristic of the overlay path between two gateways 106 without introducing network traffic overhead. The basic idea behind the virtual packet train is to reschedule packets going out on the various gateway tunnels outbound from a gateway 106 so that all the packets on the same gateway tunnel are bunched together. By measuring the separation between the different packets that come together, the receiving enclave can determine the characteristics of the wide area network.

Figure 2:
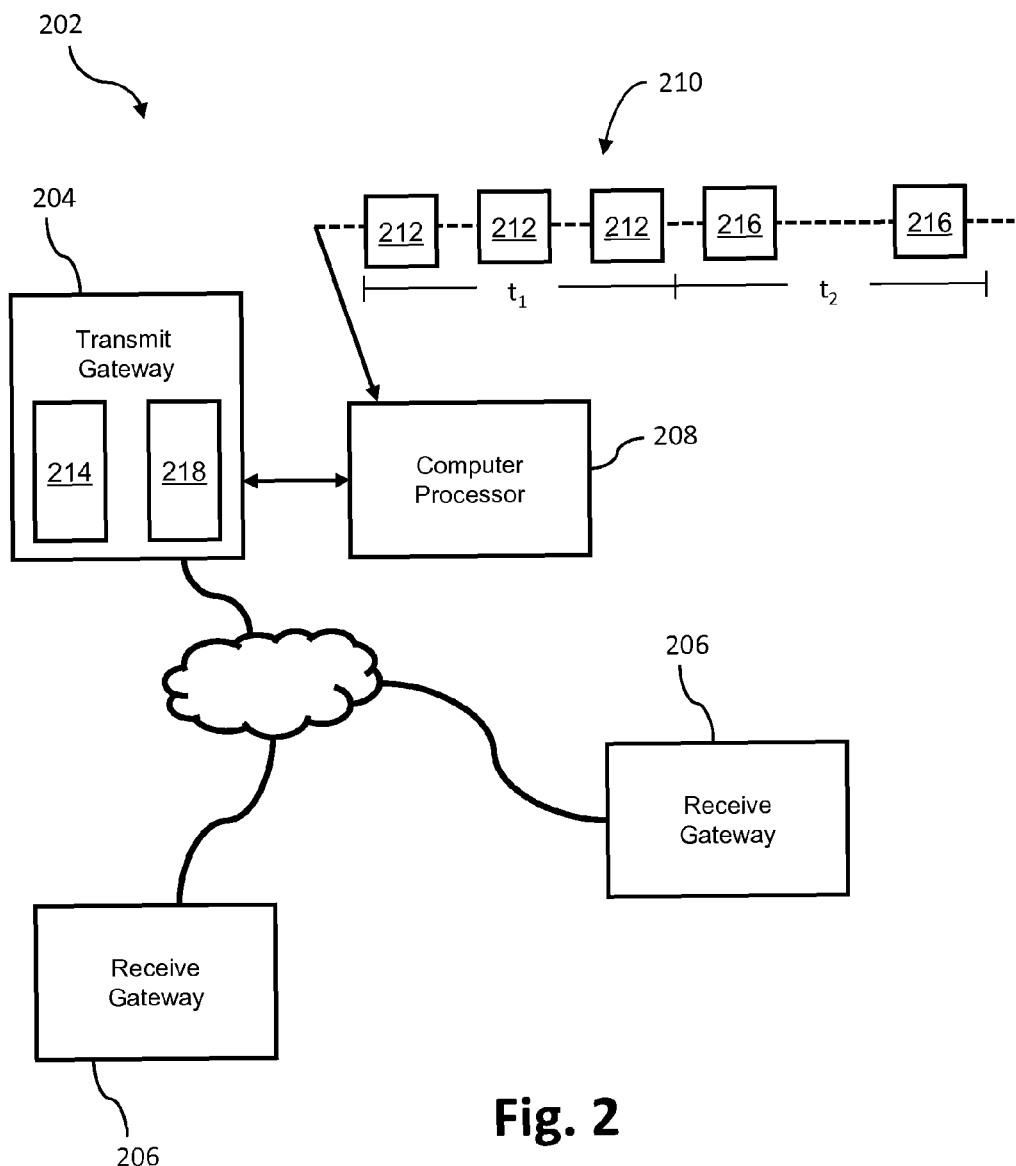
FIG. 2 shows a system for monitoring traffic characteristics between gateways in a computer network according to one embodiment of the present invention.

FIG. 2 shows a system 202 for monitoring traffic characteristics between gateways in a computer network according to one embodiment of the present invention. The system 202 includes a transmit gateway 204, a plurality of receive gateways 206, and a computer processor 208. In one configuration, the computer processor 208 is incorporated into the transmit gateway 204.

The computer processor 208 is configured to receive a stream of network packets 210. When the first network packets 210 are received within a first predetermined period of time $t_1$, the computer processor 208 adds first network packets 212 from the stream of network packets 210 to a first packet frame 214. Thus, the first packet frame 214 consists of a sequence of network packets for transmission by the transmit gateway 204 to the plurality of receive gateways 206.

As discussed in detail below, the computer processor 208 reorders the network packets in the first packet frame 214 such that reordered network packets in the first packet frame 214 addressed to the same receive gateway of the plurality of receive gateways 214 are send in uninterrupted succession. The computer processor 208 then transmits the reordered network packets in the first packet frame 214 from the transmit gateway 204 to the receive gateways 206.

The process is repeated as more network packets arrive. Thus, the computer processor 208 is configured to add second network packets 216 from the stream of network packets 210 to a second packet frame 218 when the second network packets 216 are received within a second predetermined period of time $t_2$. In one embodiment, the first predetermined period of time $t_1$ and the second predetermined period of time $t_2$ are equal in duration.

The computer processor may be configured to dynamically adjust the duration of the first predetermined period of time $t_1$ and the second predetermined period of time $t_2$. The computer processor may communicate the duration of the first predetermined period of time $t_1$ and the second predetermined period of time $t_2$ to the plurality of receive gateways 206.

The plurality of receive gateways 206 are configured to monitor separation and losses of the reordered network packets from the first packet frame 214 and the second packet frame 218 to determine network path characteristics. In one embodiment, the receive gateways 206 are configured to identify the reordered network packets belonging to the first packet frame 214 as network packets separated by less than half a duration of the first packet frame.

Figure 3:
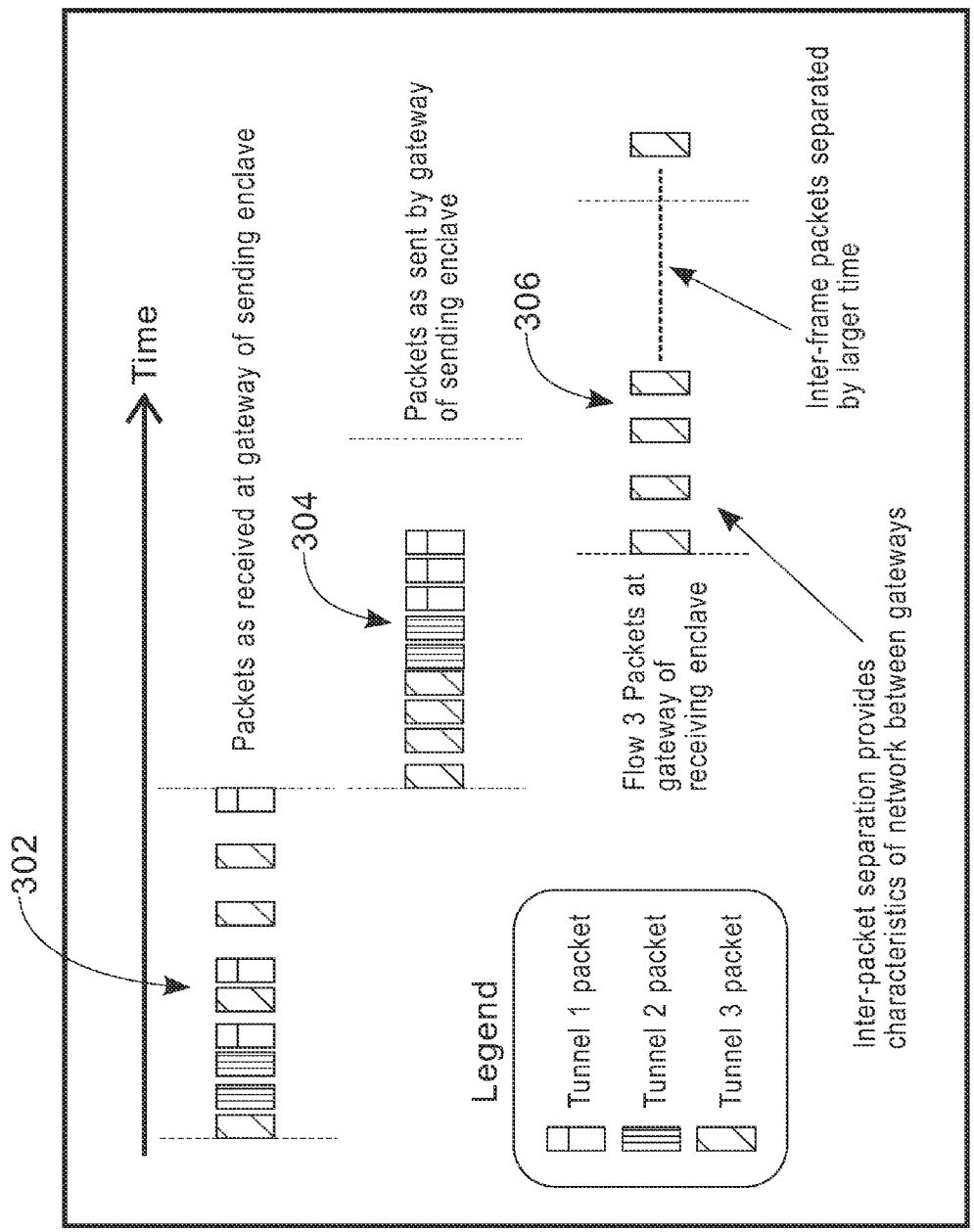
FIG. 3 shows packets on different gateway tunnels, as contemplated by one embodiment of the present invention.

The basic packet reordering operation of the system can be viewed in FIG. 3. The packets flowing out of an enclave are divided into virtual frames, each frame is determined over a certain period of time. The frames are not physical transmission frames, but determined solely by the passage of time. The exact duration of the frame can be adjusted dynamically and exchanged among different gateways using a coordination process. The sending gateway collects all the packets that arrive during the interval of a preceding virtual frame, and transmits them in the next virtual frame after reordering the packets. All the packets within the virtual frame are reordered so that packets on the same gateway tunnel are sent in a bunch together.

The packets are received at the receiving gateway at a separation which is introduced due to the characteristics of the wide area network between them. By observing the separation between the different packets, the path characteristic of connectivity between the different gateways can be determined by the receiving gateway. Since the packets on any gateway tunnel between two consecutive virtual frames will be separated by half the virtual frame interval, the receiving gateway can identify which packets belong to which frame by observing the separation.

In FIG. 3, packets on different gateway tunnels (a path between two gateways) are shown with different shading. There are three packet sequences shown in the figure. The upper most is the sequence of packets 302 as they arrive at the gateway of a sending enclave. The middle sequence 304 shows how the packets are transmitted. The bottom-most sequence 306 shows how a subset of those packets will be received at the gateway on the receiving enclave. In the upper most packet sequence, packets are received at the sending gateway and they arrive with all packets interleaved in a random order. The transmission happens in the next virtual packet frame as shown in the middle of the diagram.

Before transmission, the sending gateway reorders the packets so that all packets travelling on a specific gateway tunnel are sent immediately one after another in a bunch. By means of this reordering, a packet train is created without any new overhead introduced in the network traffic.

When these packets are received at the receiving gateway, they will be separated out because of the bottleneck delay introduced by the WAN. Some of the packets may even be dropped. By observing the inter-packet spacing and the number of received packets, the receiving gateway can determine the characteristics of the information flow between the sending enclave and itself. While the virtual packet train delays the packets in the network by one virtual frame time interval, it imposes no additional traffic overhead in the network.

If the receiving gateway sends the average spacing of packets in the same frame and the number of packets received per frame information to the originating gateway, characteristics such as the bottleneck latency and loss rate on the information flows can be determined. Determining network characteristics based on received network packet trains is known in art (see, e.g., Srinivasan Keshav, Packet-Pair Flow Control, AT&T Bell Laboratories 600 Mountain Avenue, Murray Hill, N.J. 07974, USA, pp. 1-42), incorporated herein by reference in its entirety.

A coordination process exchanges information about the packets and frame after a fixed number of virtual frame intervals, e.g., every 10 virtual frame intervals. This allows the use of statistical analysis to determine the cases where packets from different frames may have gotten closed together, and to get a better estimate.

The virtual packet train technology can be used to monitor unicast gateway tunnels as well as multicast gateway tunnels. The unicast path followed by a packet between two gateways may or may not be the same as the multicast path depending on the characteristics of the multicast protocol that is used. By examination of packet headers on both the sending and receiving gateways, multicast and unicast packets can be readily separated, and the characteristics of the network between them be assessed depending on the observed packet separation and any associated losses.

Figure 4:
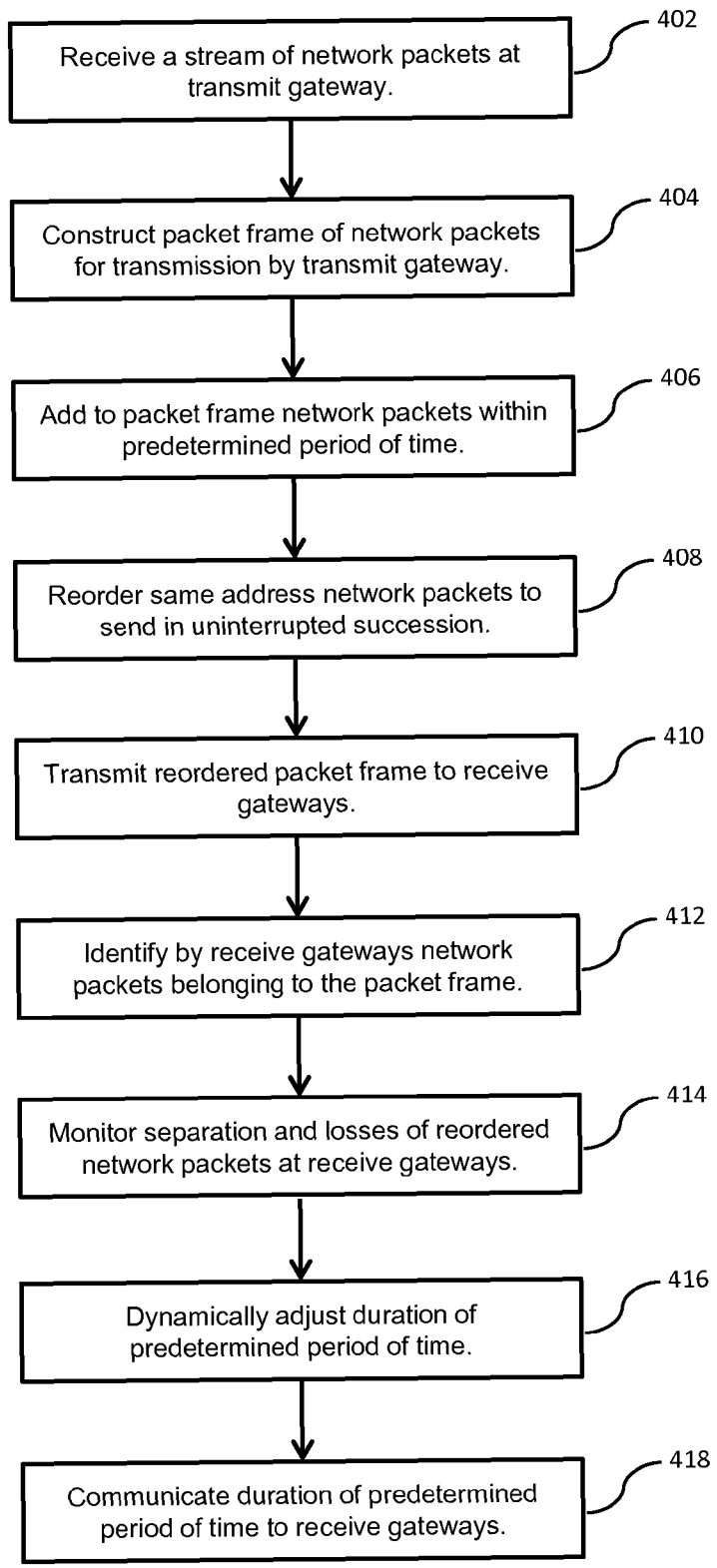
FIG. 4 shows an example method for monitoring traffic characteristics between gateways in a computer network contemplated by the present invention.

FIG. 4 shows an example method for monitoring traffic characteristics between gateways in a computer network contemplated by the present invention.

The illustrated process begins with receiving operation 402. During this operation, a stream of network packets are received at the transmit gateway. After receiving operation 402 is performed, control passes to constructing operation 404.

At constructing operation 404, a first packet frame consisting of a sequence of network packets for transmission by a transmit gateway to a plurality of receive gateways is constructed. After constructing operation 404 is performed, control passes to adding operation 406.

At adding operation 406, first network packets from the stream of network packets are added to the first packet frame when the first network packets are received at the transmit gateway within a first predetermined period of time. After adding operation 406 is performed, control passes to reordering operation 408.

At reordering operation 408, network packets in the first packet frame are reordered such that reordered network packets in the first packet frame addressed to the same receive gateway of the plurality of receive gateways are send in uninterrupted succession. After reordering operation 408 is performed, control passes to transmitting operation 410.

At transmitting operation 410, the reordered network packets in the first packet frame are transmitted from the transmit gateway to the receive gateways. After transmitting operation 410 is performed, control passes to identifying operation 412.

At identifying operation 412, the reordered network packets belonging to the first packet frame are identified at the receive gateways as network packets separated by less than half a duration of the first packet frame. After identifying operation 412 is performed, control passes to monitoring operation 414.

At monitoring operation 414, separation and losses of the reordered network packets from the first packet frame are monitored at the receive gateways to determine network path characteristics. After monitoring operation 414 is performed, control passes to adjusting operation 416.

At adjusting operation 416, the duration of the first predetermined period of time can be dynamically adjusted. After adjusting operation 416 is performed, control passes to communicating operation 418.

At communicating operation 418, the duration of the first predetermined period of time is communicated to the receive gateways.

The operations described above may be repeated. Thus, the process may further include adding second network packets from the stream of network packets to a second packet frame when the second network packets are received at the transmit gateway within a second predetermined period of time after the first predetermined period of time. It is contemplated that the first predetermined period of time and the second predetermined period of time are equal in duration.

As discussed above, the methodology for monitoring traffic characteristics between gateways in a network includes: step (i) defining a virtual frame including a sequence of packets flowing out of a first gateway; step (ii) reordering the packets collected in a frame so that packets to same destination gateways are sent consecutively; step (iii) transmitting packets in the new order in the next virtual frame; and step (iv) monitoring the separation and losses of packets at the receiving gateway to determine path characteristics. Embodiments of the present invention allow the monitoring of network performance without introducing new packets in the network, thus improving network performance.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present invention may be embodied as a system, method or computer program product. Accordingly, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for monitoring traffic characteristics between gateways in a computer network, the method comprising:
   constructing a first packet frame consisting of a sequence of network packets for transmission by a transmit gateway to a plurality of receive gateways;
   reordering network packets in the first packet frame by a computer processor such that the reordered network packets in the first packet frame addressed to the same receive gateway of the plurality of receive gateways are send in uninterrupted succession; and
   transmitting the reordered network packets in the first packet frame from the transmit gateway to the plurality of receive gateways.

2. The method of claim 1, further comprising:
   receiving a stream of network packets at the transmit gateway; and
   adding first network packets from the stream of network packets to the first packet frame when the first network packets are received at the transmit gateway within a first predetermined period of time.

3. The method of claim 2, further comprising:
   adding second network packets from the stream of network packets to a second packet frame when the second network packets are received at the transmit gateway within a second predetermined period of time after the first predetermined period of time; and
   wherein the first predetermined period of time and the second predetermined period of time are equal in duration.

4. The method of claim 3, further comprising: dynamically adjusting the duration of the first predetermined period of time and the second predetermined period of time.

5. The method of claim 4, further comprising: communicating the duration of the first predetermined period of time and the second predetermined period of time to the plurality of receive gateways.

6. The method of claim 1, further comprising: monitoring, at the plurality of receive gateways, separation and losses of the reordered network packets from the first packet frame to determine network path characteristics.

7. The method of claim 2, further comprising: identifying, at the plurality of receive gateways, the reordered network packets belonging to the first packet frame as network packets separated by less than half a duration of the first packet frame.

8. A system for monitoring traffic characteristics between gateways in a computer network, the system comprising:
   a transmit gateway;
   a plurality of receive gateways;
   a computer processor configured to:
      construct a first packet frame consisting of a sequence of network packets for transmission by the transmit gateway to the plurality of receive gateways;
      reorder network packets in the first packet frame such that the reordered network packets in the first packet frame addressed to the same receive gateway of the plurality of receive gateways are send in uninterrupted succession; and
      transmit the reordered network packets in the first packet frame from the transmit gateway to the plurality of receive gateways.

9. The system of claim 8, wherein the computer processor is further configured to:
   receive a stream of network packets; and
   add first network packets from the stream of network packets to the first packet frame when the first network packets are received within a first predetermined period of time.

10. The system of claim 9, wherein the computer processor is further configured to:
   add second network packets from the stream of network packets to a second packet frame when the second network packets are received at the transmit gateway within a second predetermined period of time after the first predetermined period of time; and
   wherein the first predetermined period of time and the second predetermined period of time are equal in duration.

11. The system of claim 10, wherein the computer processor is further configured to:
   dynamically adjust the duration of the first predetermined period of time and the second predetermined period of time.

12. The system of claim 11, wherein the computer processor is further configured to:
   communicate the duration of the first predetermined period of time and the second predetermined period of time to the plurality of receive gateways.

13. The system of claim 8, wherein the plurality of receive gateways are configured to monitor separation and losses of the reordered network packets from the first packet frame to determine network path characteristics.

14. The system of claim 13, wherein the plurality of receive gateways are configured to identify the reordered network packets belonging to the first packet frame as network packets separated by less than half a duration of the first packet frame.

15. A computer program product for monitoring traffic characteristics between gateways in a computer network, the computer program product comprising;
   a non-transitory computer readable storage medium having computer readable program code embodied therewith, the computer readable program code configured to:
   construct a first packet frame consisting of a sequence of network packets for transmission by a transmit gateway to a plurality of receive gateways;
   reorder network packets in the first packet frame such that the reordered network packets in the first packet frame addressed to the same receive gateway of the plurality of receive gateways are send in uninterrupted succession; and
   transmit the reordered network packets in the first packet frame from the transmit gateway to the plurality of receive gateways.

16. The computer program product of claim 15, further comprising:
   receiving a stream of network packets at the transmit gateway; and
   adding first network packets from the stream of network packets to the first packet frame when the first network packets are received at the transmit gateway within a first predetermined period of time.

17. The computer program product of claim 16, further comprising:
   adding second network packets from the stream of network packets to a second packet frame when the second network packets are received at the transmit gateway within a second predetermined period of time after the first predetermined period of time; and
   wherein the first predetermined period of time and the second predetermined period of time are equal in duration.

18. The computer program product of claim 17, further comprising: dynamically adjusting the duration of the first predetermined period of time and the second predetermined period of time.

19. The computer program product of claim 18, further comprising: communicating the duration of the first predetermined period of time and the second predetermined period of time to the plurality of receive gateways.

20. The computer program product of claim 15, further comprising: monitoring, at the plurality of receive gateways, separation and losses of the reordered network packets from the first packet frame to determine network path characteristics.

* * * * *